solution, in suitable containers. The excess acidity of the solution, due to the decomposition of the sulfites, is gotten rid of both by heat and also by the carbonates of the metals, alkalis, alkaline earths or a mixture of same used in effecting the precipitation of the copper. Sulfites are formed which may precipitate out of the solution and which can be separated, and $SO_2$ gas and their valuable basic contents recovered therefrom. A current of air will also assist in reducing the acidity of the solution. The formation of calcium sulfate due to oxidation is effective in reducing said acidity, and any such sulfate formed can be separated and recovered for use.

It is my intention of effecting the functioning of this process for the purpose of cheapness of operation by 1st, using $SO_2$ gas and water; 2nd, using $SO_2$ gas, water and heat; 3rd, using $SO_2$ gas, water and a soluble chlorid or a mixture of soluble chlorids as aforementioned, along with heat when necessary; or using the above means in part, together or in combination, also using the soluble chlorids mentioned in part, together or in combination for the purpose of extracting the metals aforementioned. The strength of the solution in soluble chlorids will vary from 5% to 20%, as may be. The solution being freed from the aforementioned metals as may be and in the manner described for the best purpose of the application of the process, the zinc is precipitated from the cold solution by the means of the suitably pulverized neutralizing agent such as oxids, carbonates, hydrates, or barium, calcium, strontium, magnesium, sodium, potassium, a mixture of same can be used, and the basic precipitate of zinc is separated by filtration or otherwise and calcined to the oxid, smelted or dissolved in any suitable manner in a solution of $SO_2$ and water with or without heat and electrolyzed in any suitable manner, whereby the zinc is recovered in metallic form.

The precautions for the removal of the acidity of the solution and recoveries of the by-products, as in the elimination of copper, should be duly observed.

Copper, arsenic, antimony, bismuth, lead, cadmium, mercury, tin, gold and silver can also be precipitated from an acid solution, as sulfids, by a suitable precipitant as $H_2S$ and the like, and are termed precipitable metals under this condition. Copper can also be precipitated by passage over iron, the precipitated metals being eliminated, the solution containing the iron, zinc, nickel, cobalt, manganese, that are not precipitable by $H_2S$ in an acid solution, is treated as aforementioned, for the precipitation of iron as a precipitable metal (i. e., one that can be precipitated under these conditions) the solution can be hot or cold. The precipitated metals are eliminated, the hot solution is neutralized as beforementioned, air is passed through and zinc is precipitated as a basic compound and under these conditions is termed precipitable metal.

Copper can be precipitated from a cold sulfite solution containing common soluble chlorids as aforementioned, as a basic compound, by passing air through the solution, and would be termed precipitable metal under this condition.

The $SO_2$ is eliminated as beforementioned and re-used, along with water, or with barren solution, in regenerating the solution for the leaching of more ore and repeating the cycle of solution, precipitation and regeneration, until the metallic contents of the ore is sufficiently exhausted.

In treating various ores it is found that same are not made up of one metal, but contain generally several different metals. Thus, zinc ores will often contain copper, iron silver and other metals. In cases where ores carry silver and copper, the copper in a sulfite solution will be a source of great annoyance and loss due to the formation of the red precipitate cuprose cupric sulfite $$Cu_2SO_3CuSO_32H_2O.$$

This is the product of a secondary reaction which takes place from the decomposition of the easily decomposed cuprous sulfite $Cu_2SO_3$ and unless this secondary reaction is overcome, the leaching of ores containing copper is impractical.

The addition of soluble chlorids such as sodium chlorid, potassium chlorid and others, due to their presence and their solvent action on copper salts in general, prevents the formation of the red copper precipitate above referred to, so that in this manner, the treatment of ores by the use of $SO_2$ gas and water where they contain copper, which would become a failure, can, by the use of soluble chlorids be successfully made use of. By way of exemplification, take an ore carrying a small amount of copper and iron, some silver and gold. If the iron is found in the ore as siderite then $$FeCO_3+SO_2+3H_2O+X(NaCl. aq.) = FeSO_33H_2OX(NaCl. aq.)+CO_2.$$

Whatever may be the form in which the copper is combined in the ore, provided it is soluble, the final result will be cuprous sulfite $Cu_2SO_3$, thus taking blue copper carbonate-lasurite (as orthocarbonate)

$$2Cu_3HCO_4+3SO_2+3H_2O+X(NaCl. aq.) = 3Cu_2SO_3X(NaCl. aq.)+2CO_2+4H_2O.$$

From this solution no red precipitate of

UNITED STATES PATENT OFFICE.

ADOLPH WAHLE, OF DAVENPORT, IOWA.

TURBINE WATER-PUMP.

1,146,375.  Specification of Letters Patent.  Patented July 13, 1915.

Application filed December 12, 1913. Serial No. 806,152.

*To all whom it may concern:*

Be it known that I, ADOLPH WAHLE, a citizen of the United States, residing at Davenport, in the county of Scott and State of Iowa, have invented new and useful Improvements in Turbine Water-Pumps, of which the following is a full, clear, and exact description.

My invention relates more particularly to rotary pumps, and particularly to pumps in which the water is expelled from the casing thereof by the action of a rapidly revolving disk or wheel.

Heretofore in pumps of this character the water was usually taken in at or adjacent to the center of the revolving member and discharged tangentially from the periphery thereof, and where, in the prior art of this class of pumps, the water was taken in at the periphery, as in my invention, the revolving disk or wheel had buckets or pockets made in its periphery that extended from side to side of the wheel, and the water-way or channel in which the said periphery revolved was substantially the same width as said wheel and of a depth corresponding to the depth of the immersed segment of the same.

The object of my invention is to provide a rotary pump in which the revolving disk is driven at a high speed in a waterway or tube the bore of which is of greater diameter and depth than the immersed part of the wheel, and create by virtue of the movements of the water alongside the immersed part of the wheel and at and within the circumference of the same a strong and powerful current of water which is expelled tangentially therefrom. This I accomplish by simple and comparatively inexpensive means, substantially as hereinafter fully described and as particularly pointed out in the claims.

In the drawings: Figure 1 is a vertical section of my improvements taken in the transverse plane of the revolving wheel or disk. Fig. 2 is a vertical section of the same taken on dotted line 2—2, Fig. 1. Fig. 3 is a perspective view of a fragment of said wheel or disk.

Broadly speaking, my invention comprises a rotary disk or wheel, and a casing consisting of a housing within which a rotary disk or wheel is journaled, and a tubular portion the bore of which is tangential to the periphery of the revolving disk. A segment of this disk extends out of its housing and through an elongated slot into the bore of the tubular portion, and, when it is revolved rapidly the peculiar construction of its sides at and adjacent its periphery draws the water into one end of said tubular portion and forcibly expels or discharges it from the other.

As illustrated in the drawings, my invention comprises a suitable casing or housing consisting of two substantially corresponding shells A and B the upper edges of which describe about two-thirds of a circle and the lower or basal edge of which describes a chord connecting the ends of the said circle. The upper circular edges of said shells are flanged toward and abut against each other, and when said shells are clamped together by bolts $x$, $x$, an elongated opening is left between their lower edges $a$ and $b$. These lower edges $a$ and $b$ are supported upon and secured to flanges made integral with and projecting laterally from a base casting C, which latter consists, preferably, of a horizontal tubular portion or pipe having basal flanges or lugs that are secured by means of bolts to a suitable bed or plate upon which the pump is permanently mounted. The upper flanged segment of this base casting is provided at about its center of width with an elongated slot $c$ that opens into the elongated opening in the bottom of the casing, but the width of this slot is slightly greater than the width of the disk and only about two-thirds that of the diameter of the bore of the casting.

Both shells of the casing are, at the centers from which their circular edges are struck, provided with laterally extending bearing bosses; boss B' of shell B being open at its outer end, and boss A' of shell A having its outer end closed. These bosses are provided with bushings $a'$ and $b'$, respectively, and a shaft or spindle D is journaled in these bushings which is driven through the medium of a pulley F on the end thereof extending out of boss B'.

On the portion of shaft D between bearing bosses B' and A' a water wheel or disk E is secured, and the hub of this wheel extends an equal distance on each side of the same, and, preferably, contacts with the adjacent ends of the bushings and prevents endwise movements of the shaft. Suitable packing is inserted in the outer end of boss B' around shaft D and a suitable gland-nut